United States Patent
Uladzimir

(10) Patent No.: US 7,342,990 B2
(45) Date of Patent: Mar. 11, 2008

(54) WAKE-UP CIRCUIT

(75) Inventor: Fomin Uladzimir, Minsk (BY)

(73) Assignee: Neotec Semiconductor Ltd., Hsinch Hsien (TW)

( * ) Notice: Subject to any disclaimer, the term of this patent is extended or adjusted under 35 U.S.C. 154(b) by 197 days.

(21) Appl. No.: 11/346,281

(22) Filed: Feb. 3, 2006

(65) Prior Publication Data

US 2006/0176155 A1   Aug. 10, 2006

(30) Foreign Application Priority Data

Feb. 5, 2005  (TW) ............................... 94103862 A

(51) Int. Cl.
*H03K 21/00* (2006.01)
(52) U.S. Cl. ...................................... 377/44
(58) Field of Classification Search ..................... None
See application file for complete search history.

(56) References Cited

U.S. PATENT DOCUMENTS 5,702,426 A * 12/1997 Pons et al. ..................... 607/27
5,973,617 A * 10/1999 Reichmeyer et al. .. 340/825.71
6,782,485 B2 * 8/2004 Takai .......................... 713/500

* cited by examiner

*Primary Examiner*—Tuan T Lam
(74) *Attorney, Agent, or Firm*—Troxell Law Office, PLLC

(57) ABSTRACT

A wake-up circuit includes a counter, a register circuit, a first logic circuit, an oscillator, a flip flop, and a second logic circuit. The wake-up circuit receives a standby signal to stop the oscillator working and to wait for the wake-up signal to reactivate the oscillator again. When the duration of the wake-up signal is shorter than an expected time of the counter, the oscillator stops working again and re-enters the saving mode. When the duration of the wake-up signal is longer than the expected time of the counter, the counter controls the flip flop to output a preset signal to the register circuit, and as a result that keeps the oscillator working even after the wake-up signal is removed by the first logic circuit operating, and then the second logic circuit operates with flip-flop to set the counter returning to a normal state to wait for a next standby signal to feed in.

10 Claims, 2 Drawing Sheets

WAKE-UP CIRCUIT

FIELD OF THE INVENTION

The present invention relates to a wake-up circuit, and more specifically to the wake-up circuit that can be applied to an oscillator circuit.

BACKGROUND OF THE INVENTION

An oscillator can produce clock signals and has widespread applications. In general, if a circuit comprises some basic sequential logic devices like a flip flop, the clock signal provided by the oscillator is needed to trigger the circuit. Conventional oscillators can be classified into a simple type of RC oscillators including transistors, resistors and capacitors, a type of voltage-controlled temperature-compensated crystal oscillators (VC-TCXO), or a type of voltage-controlled crystal oscillators (VCXO). The determination of using a specific type of the oscillators is usually made by judging the characteristics of the oscillator and the clock frequency that the circuit needs. Definitely, the oscillator needs power (electric energy) to work.

On the other hand, for most of portable electric products, such as laptops, personal digital assistants (PDAs) and mobile phones, batteries are usually the only power sources (i.e. power supplies). It is well known that the operation time of any battery is limited due to its material, volume and weight. Therefore, the portable electric products should promote the utilization rate of electric energy so as to reach the most effective exploitation upon the battery. Basically, the conception of saving electric energy is the same important not only for portable electric products but also for normal electric products. Such a trend can be seen from that most electric devices in the market have a so-called energy (power) saving mode to decrease the consumption of the power.

Usually, the designer always neglects the power consumption of the oscillator circuit who still works normally even the whole device has entered the power saving mode. Accordingly, to further implant the energy saving idea upon the oscillator, the present invention discloses a wake-up circuit to standby the oscillator if necessary.

SUMMARY OF THE INVENTION

The object of the invention is to provide a wake-up circuit having an oscillator that achieve the purpose of power saving.

The wake-up circuit of the present invention comprises a first flip flop, a second flip flop, a third flip flop, an OR gate, an oscillator, a counter, a NAND gate, and a NOR gate. The first flip flop that receives a standby signal as its clock signal includes a preset terminal and an input terminal connected to the ground. The second flip flop that receives an output signal of the first flip flop as its clock signal includes another preset terminal and another input terminal connected to the ground. The OR gate includes a first input terminal and a second input terminal, in which the first input terminal receives the output signal of the second flip flop, and the second input terminal receives a wake-up signal.

The oscillator is controlled by the OR gate, and the counter is controlled by the oscillator. The third flip flop receives a data signal and a clock signal, in which the data signal is the output signal of the highest bit register or logic combination of several bits in the counter and the clock signal is the output signal of the oscillator. The third flip flop is connected to both the preset terminals of the first and the second flip flops. The NAND gate includes another first input terminal and another second input terminal, in which the first input terminal connects to the output terminal of the third flip flop and the second input terminal connects to the output terminal of the OR gate. The NOR gate includes also its own first input terminal and second input terminal, in which the first input terminal receives the output signal of the NAND gate and the second input terminal receives the output signal of the first flip flop.

When the wake-up circuit receives the standby signal, the oscillator is stopped working to have the wake-up circuit enter the standby state. In the case that the wake-up signal is fed into the wake-up circuit but the existence duration of the wake-up signal is shorter than an expected time of the counter, the oscillator is stopped working again entering into the saving mode as soon as the wake-up signal is removed. In the case that the existence duration of the wake-up signal is longer than the expected time of the counter, the counter will order the third flip flop to output a preset signal to both the preset terminals of the first and the second flip flops. Then, the OR gate will enable the oscillator to work even the wake-up signal is removed. According to the NAND gate and the NOR gate, the counter can be reset to the normal state and wait for a next standby signal to feed in.

BRIEF DESCRIPTION OF THE DRAWINGS

The present invention satisfies the needs noted above as will become apparent from the following descriptions, when read in conjunction with the accompanying drawings.

DETAILED DESCRIPTIONS OF THE PREFERRED EMBODIMENT

The present invention relates to a wake-up circuit, and more specifically to the circuit that is applied to an oscillator. In this invention, the oscillator is controlled to turn on or turn off by a wake-up signal. In addition, by setting an expected time for the counter, the wake-up circuit can avoid accidental wake-up of the oscillator caused by noises while in a standby state. The invention is described in respect to a specific and preferred embodiment thereof, and there are many variations and modifications, which will immediately become apparent to those skilled in the art.

Figure 1:
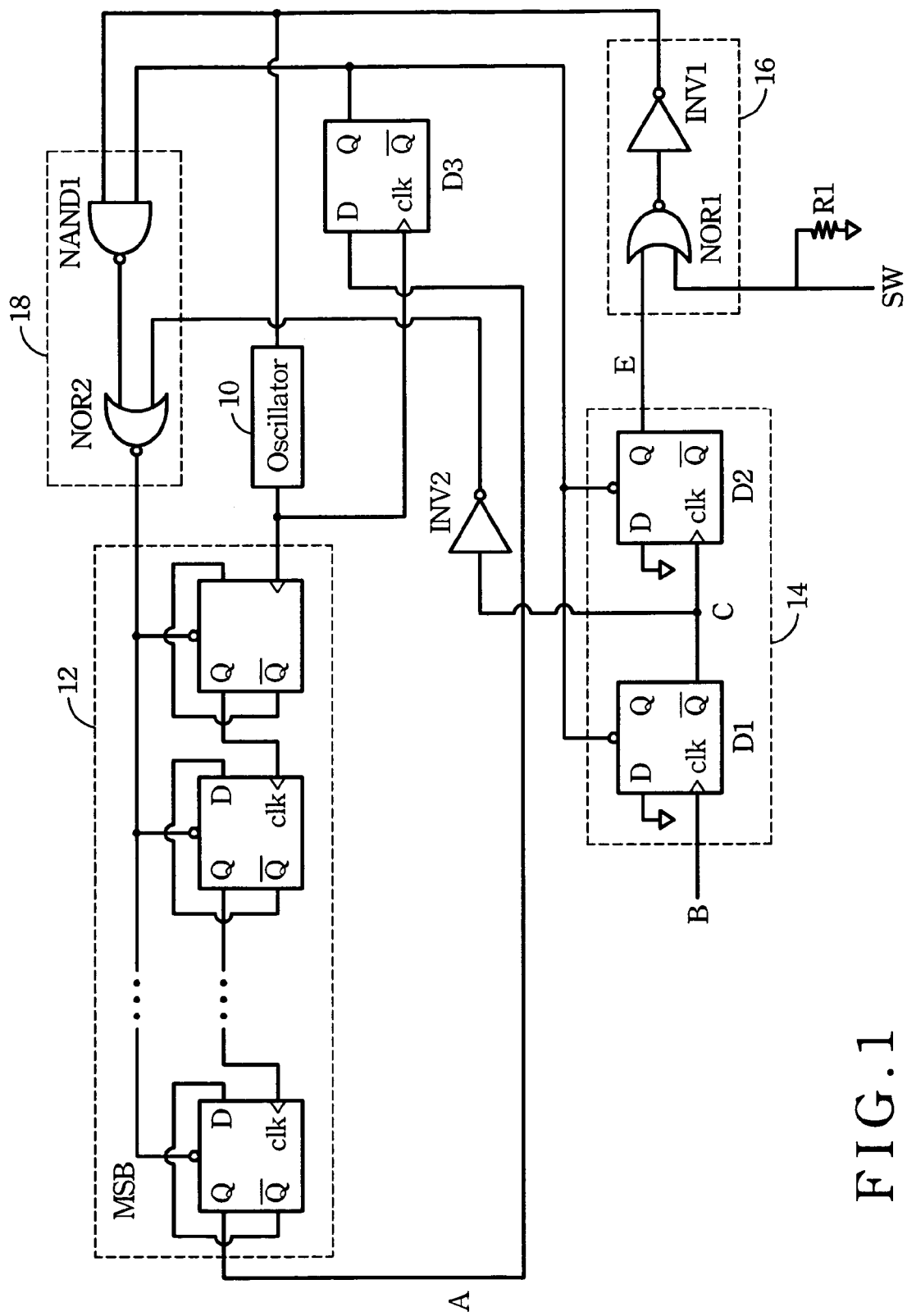
FIG. 1 is a block diagram of a preferred wake-up circuit in accordance with the present invention.

FIG. 1 shows a preferred wake-up circuit having an oscillator according to the present invention. The wake-up circuit includes an oscillator 10, a counter 12, a register circuit 14, a first logic circuit 16, and a second logic circuit 18. The counter 12 is composed of plural D-type flip flops (DFF). The register circuit 14 is composed of a first DFF D1 and a second DFF D2, and the first DFF D1 cascades the second DFF D2. The first logic circuit 16 is composed of an NOR gate NOR1 and an inverter INV1, and the NOR gate NOR1 cascades the inverter INV1. The second logic circuit 18 is composed of an NAND gate NAND1 and an NOR2 gate NOR2, and the NAND gate NAND1 cascades the NOR2 gate NOR2. A standby signal is fed into a clock terminal of the first DFF D1, and a wake-up signal SW is fed into one of the input terminals of the NOR gate NOR1.

According to the wake-up circuit of the present invention, when the potential of the standby signal is raised from a low level to a high level while the wake-up signal is in a low level, the oscillator 10 will be stopped and pose in a saving state. In the saving state, only a meaningful wake-up signal can trigger the oscillator 10 to restart. When the duration of a new wake-up signal is shorter then an expected time of the counter 12, the oscillator 10 will be waked up temporally and stopped immediately after wake-up signal disappearing so as to maintain its saving state. That is to say that this wake-up signal is only treated as a noise and is thus ignored. However, in the case that the duration of the incoming wake-up signal is longer then the expected time of the counter 12, the oscillator 10 will be really waked up. Then, the oscillator 10 will stay at the wake-up state unless a new standby signal is introduced.

It is noted that all the flip flops in this embodiment are D-type flip flops. According to a real application, those people whom are skilled in the art can use JK-type flip flops or T-type flip flops to substitute the DFFs without sacrificing the aforesaid operations and advantages provided by the present invention. In the present invention, the expected time is set by the counter 12 to avoid the oscillator 10 to be accidentally waked up by an external noise.

Figure 2:
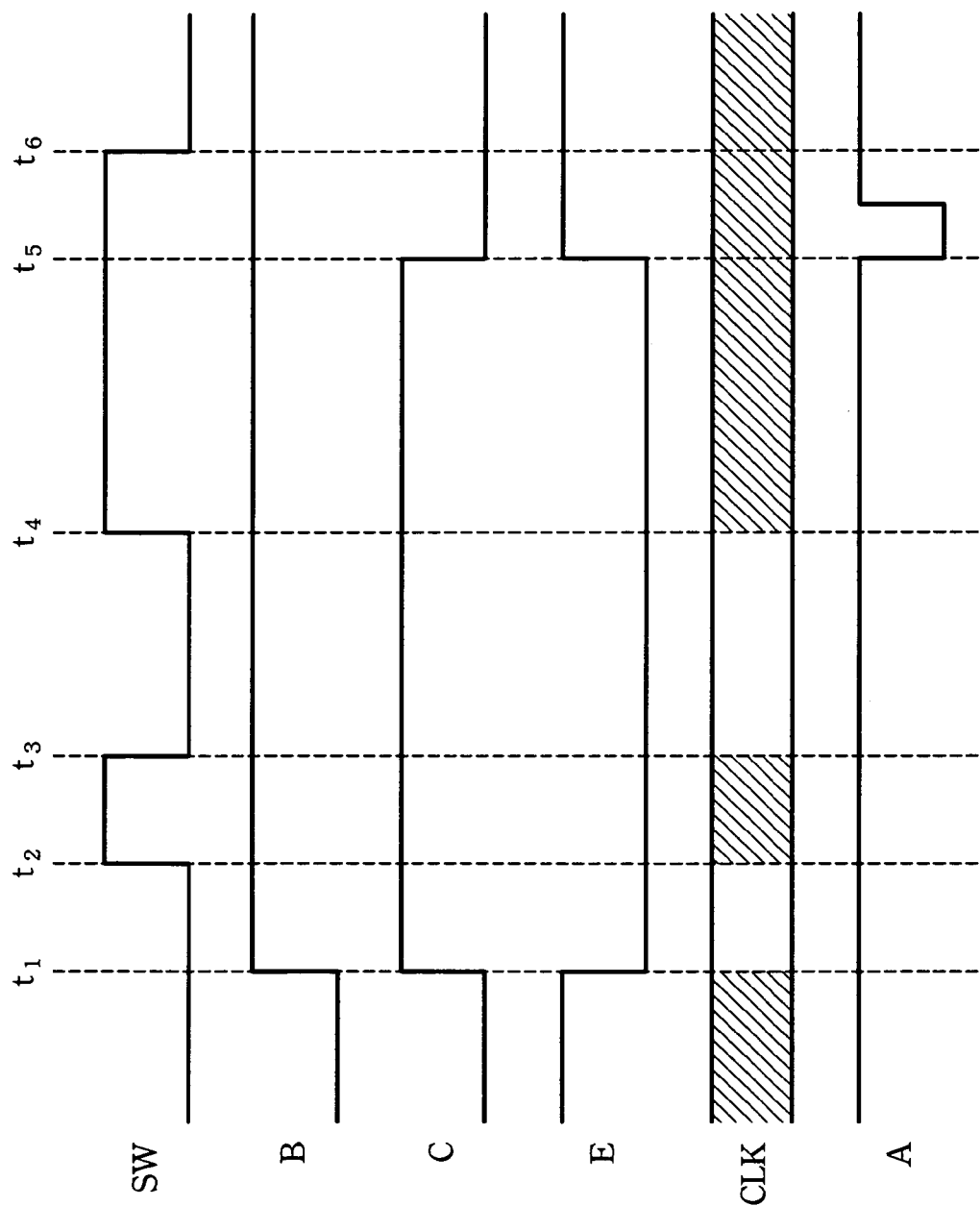
FIG. 2 is a timing diagram for FIG. 1, showing the relationship between some of the connection nodes.

Please refer to FIG. 1 and FIG. 2 simultaneously, in which FIG. 2 is a typical timing diagram for FIG. 1. When the wake-up circuit is in the initial normal state, the output signal at a Q terminal of the third DFF D3 is zero, and thus the preset terminals of the DFFs D1 and D2 that receive the output signal of the third DFF D3 can output a high level signal to the first logic circuit 16 via a node E. The first logic circuit 16 is then issuing a signal to drive the oscillator 10. In addition, the NAND gate NAND1 receives two signals, one high level signal from the inverter INV1 and the other low level signal from the third DFF D3. Thus, the NAND gate NAND1 outputs a high level signal to the NOR gate NOR2, and the NOR gate NOR2 outputs a low level signal to preset the counter 12. The counter 12 outputs a high level signal from the node A to trigger the third DFF D3 for outputting a high level signal. It is noted that the high output signal of the third DFF D3 does not vary, the output conditions of the DFFs D1 and D2.

When the signal at the node B is rising from low (0) to high (1), referring to the time t1 in FIG. 2, to trigger the first DFF D1 to output a high level signal, and the second DFF D2 is triggered by the rising edge at the node C to output a low level signal at the node E, the wake-up circuit is put into standby mode. At this time, the wake-up signal SW to feed the NOR gate NOR1 is zero, so that the NOR gate NOR1 can output a high level signal to the inverter INV1. Then, the inverter INV1 outputs a low level signal to shut down the oscillator 10. In the present invention, it is noted that the first logic circuit composed of the NOR gate NOR1 and the inverter INV1 can be substituted by an OR gate. Besides, the NAND gate outputs a high level signal caused by the low level signal outputted from the inverter INV1, and the NOR gate NOR2 outputs a low level signal to preset the counter 12. However, the oscillator 10 is now shut down and doesn't generate the clock signal CLK, so the counter 12 and the third DFF D3 will not be triggered. At this stage, the wake-up circuit is almost no power consumption at all.

When the wake-up signal SW is high at the time t2, the NOR gate NOR1 outputs a low level signal to the inverter INV1. The inverter INV1 outputs a high level signal to drive the oscillator 10, and at this time the NAND gate NAND1 outputs a low level signal for the two input signals of the NAND gate NAND1 were already at the high levels. The NOR gate NOR2 outputs a high level signal due to the two input signals of the NOR gate NOR2 were at the low levels. The counter 12 outputs a clock signal according to the output of the oscillator 10. In this embodiment, the counter 12 is a down asynchronous counter like a ripple counter and can output a high level signal at the node A in the expected time. Though the counter 12 is the down ripple counter in this embodiment, yet many variations counters can be substituted for the counter 12 by just modifying some parts of the circuit to operate in coordination. Such a substitution technique is well known to an ordinary skilled person in the art after knowing the aforesaid teaching of the present invention.

As shown from t2 to t3 in FIG. 2, for the time duration of high levels in SW is shorter than the expected time, the signal of the node E is maintained at the original low level. At t3, the inverter INV1 outputs a low level signal to shut down the oscillator 10 according to the output high level signal of the NOR gate NOR1. Moreover, the NAND gate NAND1 outputs a high level signal according to the output low signal of the inverter INV1, and then the NOR gate NOR2 outputs a low level signal to re-stop the counter 12.

In the standby state, when the wake-up signal SW is raised to a high level at time t4, the NOR gate NOR1 outputs a low level signal according to the low level signal of the node E. The inverter INV1 outputs a high level to trigger the oscillator 10, and the counter 12 is reactivated to count at the same time. It is noted that the oscillator 10 is stopped and thus minimizes its energy consumption at the duration from t3 to t4.

At the time t5, the counter 12 outputs a low level signal caused by the duration of the high wake-up signal SW exceeding the expected time. The DFF D3 outputs a low level signal to preset the DFFs D1 and D2. The DFF D1 outputs the signal from high to low at the node C, and the DFF D2 outputs a high signal at the node E. The low signal of the node C passes through the inverter INV2 to have the NOR gate NOR2 output a low level signal to preset the counter 12. The counter 12 replies to have its signal raised to a high level signal at the node A. On the other hand, the oscillator 10 cannot be automatically shut down again at this time in view of the high output signal of the DFF D2 and the low wake-up signal at the time t6. Before the wake-up signal SW to trigger the oscillator 10 can return, the wake-up circuit will be firstly set in the standby state. That is to say that the node B should have its standby signal vary from high to low and then from low to high again.

The wake-up circuit of the present invention has the following advantages.

(1) In the standby state, the oscillator of the wake-up circuit is turned on or off by the wake-up signal so that the goal of saving power can be achieved in the present invention.

(2) In the standby state, by providing the expected time setting for the counter, the oscillator can avoid to be accidentally waked up by unexpected noise, and thus the wake-up circuit can save power effectively in the present invention.

Although the present invention and its advantages have been described in detail, as well as some variations over the disclosed embodiments, it should be understood that various other changes, substitutions and alterations can be made herein without departing from the spirit and scope of the invention as defined by the appended claims.

I claim:

1. A wake-up circuit comprising:
   a counter;
   a register circuit including a data terminal and a clock terminal, wherein said clock terminal receives a standby signal;

a first logic circuit, connected to one of two output terminals of said register circuit, receiving a wake-up signal;

an oscillator, controlled by an output signal of said first logic circuit, including an output terminal connected to said counter;

a flip flop, including another data terminal, another clock terminal and a further output terminal, wherein said data terminal of said flip flop receives another output signal of a highest bit register in said counter, said clock terminal of said flip flop receives an output signal of said oscillator, and said output terminal connects to preset terminals of said register circuit; and a second logic circuit, including a one-more input terminal and a one-more output terminal, wherein said input terminal of said second logic circuit connects to the output terminal of said first logic circuit, the output terminal of said flip flop, and another one of the two output terminals of said register circuit, said output terminal of said second logic circuit coupling to preset said counter;

whereby said wake-up circuit receives the standby signal to stop said oscillator working and then waits for the wake-up signal to reactivate said oscillator again; when the duration of the wake-up signal is smaller than an expected time of said counter, said oscillator stopping working again and entering a saving mode; when the duration of the wake-up signal is longer than the expected time of said counter, said counter controlling said flip flop to output a preset signal to said register circuit, said first logic circuit operating to have said oscillator working even the wake-up signal is removed, and then said second logic circuit operating to set said counter returning to a normal state and waiting for a next standby signal to feed in.

2. The wake-up circuit of claim 1, wherein said counter is a down ripple counter.

3. The wake-up circuit of claim 1, wherein said register circuit is composed of a first D-type flip flop and a second D-type flip flop, data terminals of said first and said second D-type flip flop connects to ground, a clock terminal of said first D-type flip flop receives the standby signal, an output (inverse Q) terminal of said first D-type flip flop connects to another clock terminal of said second D-type flip flop, and another output (Q) terminal of said second D-type flip flop is defined as the first output terminal of said register circuit, wherein a connection node of the output (inverse Q) terminal of said first D-type flip flop and the clock terminal of said second D-type flip flop is defined as the second output terminal of said register circuit.

4. The wake-up circuit of claim 3, wherein said first logic circuit is composed of an inverter and a NOR gate having two input terminals, one said input terminal of said NOR gate connected to the first output terminal of said register, the other input terminal of said NOR gate receiving the wake-up signal, an output terminal of said inverter being defined as the output terminal of said first logic circuit.

5. The wake-up circuit of claim 1, wherein said flip flop is a D-type flip flop.

6. The wake-up circuit of claim 3, wherein said second logic circuit is composed of a NOR gate and a NAND gate, two input terminals of said NAND gate connected respectively to the output terminal of said first logic circuit and the output terminal of said flip flop, two input terminals of said NOR gate coupled respectively to an output terminal of said NAND gate and the second output terminal of said register circuit, an output terminal of said NOR gate being defined as the output terminal of said second logic circuit.

7. A wake-up circuit comprising:

a first flip flop, having a preset terminal and an input terminal connected to a ground, receiving a standby signal as a clock signal;

a second flip flop, having another preset terminal and another input terminal connected to a ground, receiving an output signal of said first flip flop as another clock signal;

an OR gate, including a first input terminal and a second input terminal, wherein said first input terminal of said OR gate receives an output signal of said second flip flop, and said second input terminal of said OR gate receives a wake-up signal;

an oscillator, controlled by an output signal of said OR gate;

a counter, controlled by an output signal of said oscillator;

a third flip flop, receiving a data signal that is an output signal of a highest bit register in said counter and a clock signal that is an output signal of said oscillator to further output to the preset terminals of said first and said second flip flop;

a NAND gate, having two input terminals connected respectively to an output terminal of said third flip flop and an output terminal of said OR gate; and a NOR gate, having two input terminals connected respectively to an output terminal of said NAND gate and an output terminal of said first flip flop;

whereby said wake-up circuit receives the standby signal to stop said oscillator working to enter a standby state and to wait for the wake-up signal to reactivate said oscillator again; when the duration of the wake-up signal is smaller than an expected time of said counter, said oscillator stopping working again to enter a saving mode after the wake-up signal is removed; when the duration of the wake-up signal is longer than the expected time of said counter, said counter controlling said third flip flop to output a preset signal to said preset terminals of said first and said second flip flops, said OR gate operating to set said oscillator working even the wake-up signal is removed, and then according to said NAND gate and said NOR gate acted to set said counter returning to a normal state and waiting for a next standby signal to feed in.

8. The wake-up circuit of claim 7, wherein said counter is a down ripple counter.

9. The wake-up circuit of claim 7, further comprising an inverter connected between the input terminal of said NOR gate and the output terminal of said first flip flop.

10. The wake-up circuit of claim 7, wherein said first, said second, and said third flip flops are all D-type flip flops.

* * * * *